Oct. 26, 1965 R. C. BUEHL 3,213,495
MEANS FOR PREVENTING SEGREGATION IN VACUUM ARC MELTING
Filed Aug. 24, 1962 2 Sheets-Sheet 1
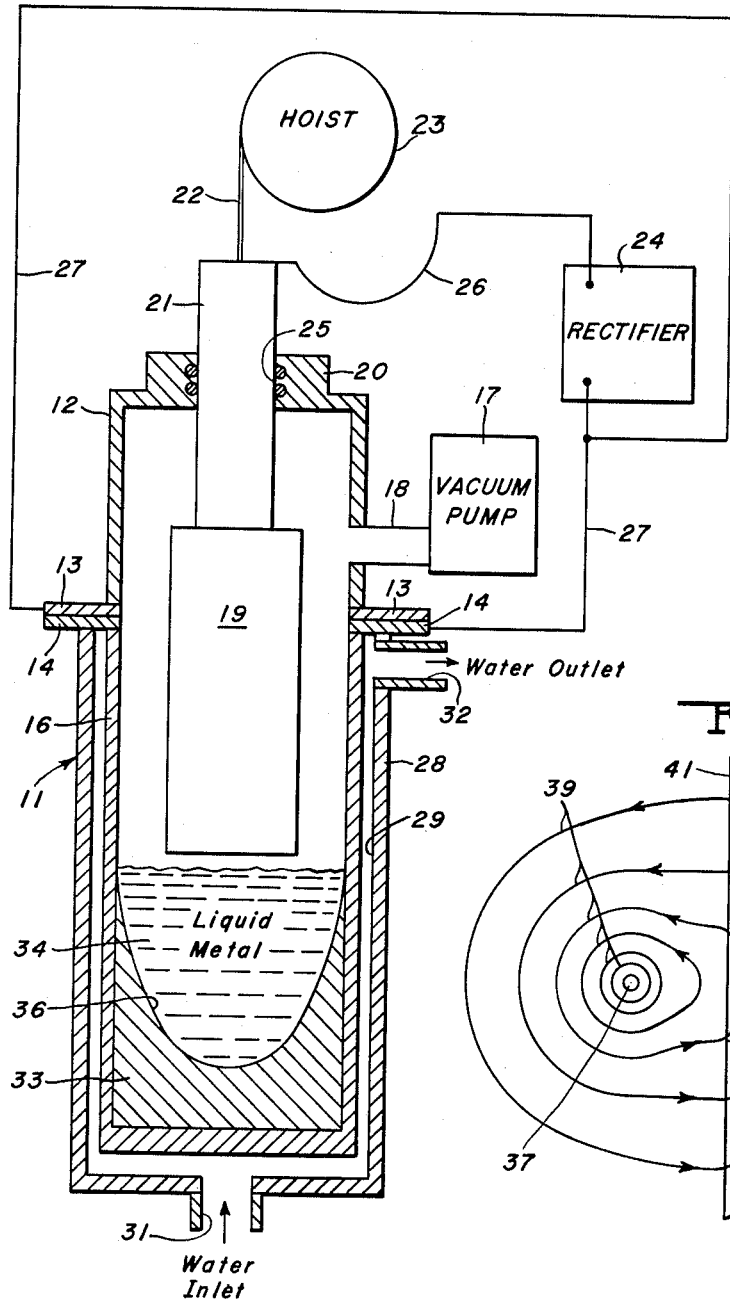
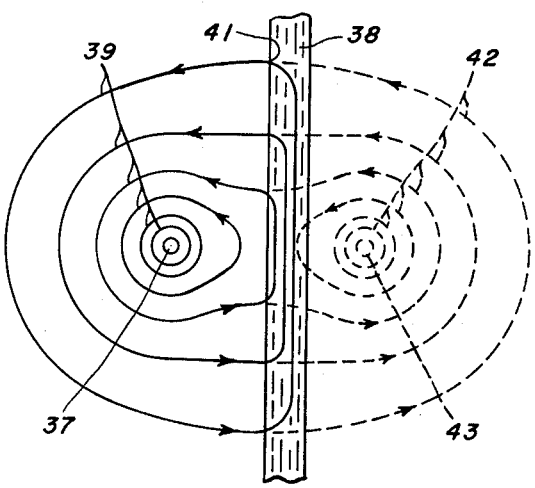
INVENTOR.
RUSSELL C. BUEHL
By
John R. Pegan
Attorney United States Patent Office 3,213,495
Patented Oct. 26, 1965

3,213,495
MEANS FOR PREVENTING SEGREGATION IN VACUUM ARC MELTING
Russell C. Buehl, Beaver, Pa., assignor to Crucible Steel Company of America, Pittsburgh, Pa., a corporation of New Jersey
Filed Aug. 24, 1962, Ser. No. 219,223
5 Claims. (Cl. 22—73)

This invention relates to methods and means for producing ingots of metals and alloys having enhanced homogeneity and consequently improved mechanical properties and, more particularly, to methods and apparatus for minimizing undesirable ingot porosity and segregation and for increasing the percentage yields of arc melted metals and alloys.

For those applications in which metals must withstand very high stresses, the metals must be homogeneous and substantially free of porosity and of non-metallic inclusions greater than a specified, small maximum size. Exemplary of such applications are missile cases, ball bearings and races for critical applications, and jet engine parts which are subjected to high temperatures.

Steel or superalloy ingots produced from air melted material most frequently exhibit appreciable alloy segregation, and considerable center porosity, as well as deleterious quantities of objectionably large non-metallic inclusions. The vacuum arc remelting process, which was developed to improve the quality of metal, as compared, for example, with that obtainable by conventional air melting techniques, has, indeed, resulted in improved quality, but the above mentioned ingot defects have not been completely eliminated by the vacuum arc remelting process.

Therefore, the objectives of the present invention include the provision of methods and apparatus for increasing the homogeneity, mechanical properties, and percentage yield of, and for decreasing objectionable nonmetallic inclusion in metal ingots produced by the vacuum arc melting process.

In accordance with the foregoing objects, this invention provides a method of increasing ingot homogeneity by creating within the melting furnace and the pool of molten metal therein, electromagnetic forces which, by their action upon the molten and freezing metal, prevent the relatively gross inhomogeneity generally observed in ingots produced in accordance with prior art processes. In effectuation of the inventive method, the invention also contemplates the provision, in an arc melting furnace of otherwise conventional construction, of an ingot mold constructed of a ferromagnetic material, such as carbon steel, which is incompletely saturated at the magnetic flux field density existing in the furnace at the operating melting current.

The foregoing and other objects of the invention will be more readily understood by reference to the following description and drawings, wherein:

FIGURE 1 is a front elevational view, partly in crosssection, and partly schematic in nature, of a simplified vacuum arc remelting furnace and associated operating devices of the general type contemplated for use in connection with the inventive method and apparatus;

FIGURE 3 is a schematic diagram illustrative of the electromagnetic fields produced within an arc melting furnace in accordance with the invention.

Figure 2:
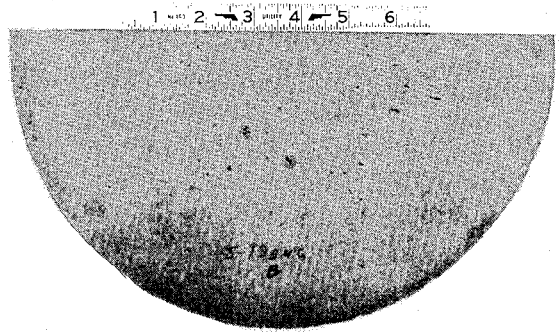
FIGURE 2 is a photographic representation of a metal ingot, vacuum arc melted in accordance with prior art practice, and illustrative of the radially oriented segregation generally observed in ingots so produced.

Referring now to the drawings, and particularly to FIGURE 1 thereof, the numeral 11 refers generally to a vacuum melting furnace comprising a cylindrical, metallic furnace shell or housing 12, to a lower extremity of which is attached, by suitable means, as flanges 13 and 14, a water-cooled, cylindrical mold 16. In prior art furnaces the mold 16 is constructed of copper because of the high heat conductivity of that metal. A vacuum pump 17 is provided with an exhaust line 18 which is interconnected with the interior of the furnace shell 12 for exhausting gases from the furnace 11. An electrode 19 is suspended concentrically within the furnace 11 and is supported therein by an electrode support 21. Mounted atop the furnace shell 12 is a suitable gasket means 20 provided with a centrally located aperture 25 for passage therethrough of the electrode support 21, and adapted to seal the interior of the furnace against ingress or egress of gases during movement of the electrode support. The latter is connected to suitable means for raising and lowering the electrode within the furnace, for example, by means of a cable 22 and hoist pulley 23. Electrical power is supplied by suitable means such as a rectifier 24 which is connected to the electrode support 21 by means of a flexible, electrical power cable 26 and to the mold 16 by means of bus bars 27. A jacket 28 is provided concentrically of the mold 16 and spaced therefrom to provide an annular space 29 for passage therethrough of a cooling fluid from a fluid inlet 31 to a fluid outlet 32.

During operation of the vacuum arc furnace the interior thereof is evacuated, by means of pump 17, to a suitably low pressure whereupon an arc is struck between the lower extremity of the electrode 19 and a mass of solidified starting metal, as 33, in the bottom of the mold 16. The electrode 19 is constructed of the metal to be melted and, when the arc is produced, the metal electrode melts and drops of molten metal fall from the lower extremity of the electrode into the mold to produce a pool 34 of molten metal which is contained within a cup-shaped depression 36 within the solidified metal 33. As melting of the electrode 19 progresses during continued operation of the furnace, the zone of solidification between the liquid metal 34 and the solidified metal 33 moves upwardly within the mold 16.

The gradual movement of the solidification zone from the bottom toward the top of the solidified ingot, as melting progresses, substantially eliminates the center porosity which is usually observed in poured ingots. Such vacuum arc melting processes and apparatus tend substantially more toward elimination of undesirable non-metallic inclusions than do prior art processes and apparatus involving the pouring of the molten metal into a mold. For example, hydrides and some nitrides decompose at the high temperatures and low pressures existing in vacuum arc furnaces and the resulting gases are pumped from the furnace. Many oxides react with carbon in the metal to yield carbon monoxide which is also evacuated from the furnace. Some, but not all, unreactive oxides are eliminated, in the vacuum arc melting furnace, by floating to the surface of the molten metal.

The factors productive of non-homogeneity in arc melted ingots are many and varied, as are the types of non-homogeneity which are observed. Certain types of non-homogeneity of arc melted ingots are less objectionable than others. Illustrative of the latter is the relatively uniformly dispersed micro-segregation in arc melted ingots. If the addition of an alloying element or an impurity to a metal melt lowers the solidification temperature thereof, the additive material is rejected from the melt during solidification, that is, the liquid metal immediately adjacent solidified metal is higher in additive content than the solid metal. The ratio of additive in the solid metal to that in the liquid metal is termed the distribution coefficient, denoted as K. The tendency to segregate is proportional to $(1-K)$. Values of K and $1-K$, for a few metals commonly used for alloying steel, and for a few impurities most often found in steel, are given in Table I.

TABLE I
*Distribution and segregation coefficients for alloys and impurities in steel*

| Element | Distribution coefficient K | Segregation coefficient $1-K$ |
| --- | --- | --- |
| Chromium | .95 | .05 |
| Nickel | .80 | .20 |
| Manganese | .84 | .16 |
| Titanium | .14 | .86 |
| Carbon | .13 | .87 |
| Oxygen | .02 | .98 |
| Sulfur | .02 | .98 |

When solidification of molten metal starts near the mold wall, as is the case in arc melting processes such as those described hereinabove, there is a steep temperature gradient in the liquid metal and the solidified surface is reasonably smooth. Adjacent the solidifying surface, the concentration of a given alloying element in the liquid metal builds up to a concentration which has a value equal to the concentration of that element in the solid metal divided by the distribution coefficient K, that is $$C_1 = \frac{C_s}{K} \qquad \text{(Equation 1)}$$

where $C_1$ is the concentration of the particular alloying component in the liquid metal and $C_s$ is the concentration of that alloying element in the solid metal. Under these conditions, the alloying element in the interfacial liquid metal, being more concentrated therein than in the main body of the liquid, diffuses into the latter. The difference in concentration of the alloying element between that in the alloying element-rich interfacial liquid and that in the main body of the liquid metal, decreases exponentially with the distance from the solidifying layer. Due to the formation of this interfacial liquid layer, concentrated in respect of a given alloying element, the amount of the latter in the solid metal rapidly approaches the concentration of the alloying element in the bulk liquid. If there is no mass flow of the alloy-rich, interfacial liquid, then segregation is confined to the initially solidifying thin layer adjacent the mold wall, which layer is low in concentration of the alloying element, and to the final liquid metal to solidify, which is high in concentration of the alloying element. After solidification proceeds a short distance inwardly of the mold wall, the temperature gradient within the liquid decreases sufficiently so that the solidifying surface ceases to be smooth but, instead, needles or cells of metal grow into the liquid. These needle-like projections of solid metal form branches and are called dendrites. The liquid between the dendrites is enriched in alloy component and impurity content as compared to the contents of those materials in the solid metal. This difference in composition between the dendrites and the interdendritic metal results in micro-segregation. Near the center of the ingot, the temperature gradient in the liquid is very small and, toward the end of the solidifying process, equiaxed crystals of solid metal form in the liquid and grow to relatively large sizes. The liquid metal between such crystals is enriched in alloy component and impurity content and results in another physical form of micro-segregation. Such micro-segregation of alloy components which is produced, as aforesaid, in the absence of substantial mass flow of liquid within the solidifying metal, may be largely removed by solid diffusion upon heating of the ingot and subsequent hot working thereof.

After elimination or minimization of micro-segregation, as by heating and/or hot working, as aforesaid, the uniformity of the chemical analysis, from the center to the outside and from the top to the bottom, of a vacuum arc melted ingot is usually satisfactory. However, severe localized segregation quite frequently occurs. Such localized segregation generally occurs in the form of a series of radial lines as illustrated in FIG. 2 which is a photographic representation of one-half of a cross-sectional slice of a 12 inch diameter ingot of an alloy steel frequently vacuum arc melted, i.e., AISI 52100 (nominal analysis: 0.95/1.10% carbon, 0.25/0.45% manganese, 0.025 phosphorus, 0.025 sulphur, 0.20/0.35 silicon, 1.30/1.60 chromium, balance iron). The sectioned surface of the illustrated sample was ground and then etched for fifteen minutes in 50% hydrochloric acid at 160° F. With such preparation, the segregates appear as dark-etching spots which, in low alloy steels, contain a higher density of sulfide-containing inclusions than does the metal matrix (lighter appearing areas of FIGURE 2). In low carbon superalloys containing several percent titanium, the segregation usually comprises a greater density of titanium nitride or carbo-nitride inclusions than the remainder of the metal.

It is believed that such gross segregation phenomena as illustrated in FIGURE 2 are produced because of a departure of the conditions within the furnace from the ideal situation postulated above, i.e., no mass flow of liquid within the solidifying ingot. The largest portion of a vacuum arc melted ingot solidifies as dendrites. Considering this portion of ingot solidification, any mass flow of the interdendritic liquid will result in slight differences in composition between various portions of the ingot. Mass flow of the liquid metal between the dendrites can result from variations in liquid metal densities, contraction during cooling and solidification, disturbances due to gas evolution, as well as the electromagnetic forces within the furnace. The rejection of alloy and impurities to the liquid adjacent solidifying metal generally alloys the density of the liquid. However, the liquid metal between the dendrites is at a lower temperature than that nearer the center of the ingot and, since contraction of the liquid metal and decreasing temperatures tends to increase the density thereof, this contraction tends to offset the decrease in density with increasing alloy or impurity content so that the resultant liquid flow might be either upwardly or downwardly. The contraction of the metal during cooling and solidification results in a net downward flow of liquid metal. On any horizontal plane of an ingot of circular cross-section, the liquid metal flow produced by the above-mentioned factors is uniform for all metal at the same distance from the center of the ingot. The resultant segregation should, therefore, be reasonably uniform in a radial direction and the liquid metal flow produced by such factors should not produce the radially oriented segregates which are commonly found in arc melted ingots, as illustrated in FIGURE 2. Therefore, another factor must be considered in explanation of such radially oriented segregates. Such a factor is the electromagnetic forces which exist in the furnace during the production of an arc melted ingot. If the surface of the molten pool is a substantial distance below the symmetrically arranged connections of the bus bars 27 to the top of the mold 16, for example, one mold diameter, the magnetic field created by these bus bars is small compared to the total field, and the magnetic field can be considered to have circular symmetry with respect to the furnace axis. The magnetic field produced by an electrical current is calculated as $$\int H dL = 0.4\pi I \qquad \text{(Equation 2)}$$

where H is the magnetic field strength in oersteds, L is the length, in centimeters, of a closed path enclosing the current I where the latter is expressed in amperes. Inasmuch as the magnetic field is symmetrical about the furnace axis, the length L of the closed path for a magnetic field strength, $H_r$, at a distance $r$, in centimeters, from the furnace axis, is $2\pi r$. Therefore, $$H_r = \frac{0.4\pi I}{2\pi r} = \frac{0.2I}{r} \quad \text{(Equation 3)}$$

Adjacent the mold wall, the entire furnace current is within the magnetic path, whereas at some smaller distance from the furnace axis, only a portion of the current is enclosed by a line of magnetic flux. If the current density is assumed constant over the cross section of the mold, then the field strength at radius $r$ is $$H_r = \frac{\pi r_2}{\pi R_2} \times \frac{0.2I}{r} = \frac{0.2rI}{R^2} \quad \text{(Equation 4)}$$

where R is the mold radius, in centimeters, and I is the total current, in amperes. The melting current, I, passing through the pool of molten metal, and the consequent magnetic field H, result in the creation of a force F exerted on the molten metal. The force F, in dynes, exerted on the molten metal, for example, upon any randomly selected column of metal, such as one having a sectional area of one square centimeter, is $$F = \frac{HlI}{10} \quad \text{(Equation 5)}$$

where I is the current in amperes carried by the column, H is the magnetic field strength, in oersteds and $l$ is the column length, in centimeters. If there is substituted in Equation 5, the average current density obtained by dividing the total melting current by the cross sectional area of the mold, since such average current denstiy is generally on the order of only a few amperes per square centimeter, the consequent electromagnetic force, F, is quite small. For example, the force F exerted upon one cubic centimeter of liquid metal near the wall of a 12 inch diameter mold is about 0.06 gram (about 590 dynes) for a (uniformly distributed) melting current of 6,000 amperes.

However, observations of the light emitted from arcs in arc furnaces of usual design, indicate that the arc does not uniformly cover the entire surface of the molten metal, but is concentrated in small regions which move over the surface of the molten pool. Current densities in the arc of usual arc melting furnaces are generally believed to be at least 1,000 amperes per square centimeter. Consequently, the total melting current, I, passing through the pool of molten metal may reasonably be considered as the summation of a large number of small, individual currents $i$ conducted by arbitrary, columnar elements or filaments of liquid metal under such concentrated arc regions. In the context of such a system, the force exerted upon any such high density current-carrying filament is more appropriately determined as follows:

$$F_c = \frac{H_c l i}{10} \quad \text{(Equation 6)}$$

where $F_c$ is the force, in dynes, exerted upon any such filament carrying high density current, $H_c$ is the total magnetic field created at the filament being considered and is the summation of the fields created at that filament by the currents carried by all other such filaments, i.e., $H_c = \Sigma(H_1 + H_2 \ldots H_n)$ where $H_1, H_2 \ldots H_n$ are the fields created by the high density currents flowing, respectively, in filaments 1, 2, ... $n$.

Assuming, as aforesaid, a current density of 1000 amperes per square centimeter, the force, $F_c$, exerted upon one cubic centimeter of molten metal in a furnace of conventional design, for example, one having a mold diameter of about 10 to 40 inches, has a value on the order of grams.

Although such forces are variable in both space and time, they are, on the average, directed radially inwardly toward the center of the molten pool and tend to maintain the current in the aforesaid concentrated arc regions. Moreover, being relatively large and localized in nature, they result in the movement of molten metal between the solidifying dendrites. It is believed, therefore, that these forces give rise to the type of segregation illustrated in FIGURE 2.

A logical means of avoiding segregation caused by such imbalance of electromagnetic forces as aforesaid, might appear to reside in the utilization of magnetic shielding to decrease the strength or to alter the direction of the magnetic field. However, a symmetrical shield of magnetic material placed around a conductor does not alter the path of magnetic flux, hence, the field strength around a closed path, as given by Equation 2 hereinabove is unaltered by such shielding and results in a field strength, $H_r$, of $$\frac{0.2I}{r}$$

as shown in Equation 3 above. That such is indeed the case was shown by measurements of the magnetic field strength determined in the absence and also in the presence of a steel pipe surrounding an electrode in a furnace of conventional design. The magnetic field strength inside the pipe was not appreciably altered by the presence of the pipe.

It has now been found, however, that the undesirable segregation usually associated with prior art arc melted ingots can be eliminated or substantially reduced by the creation within the furnace of forces acting upon the molten liquid in opposition to the aforesaid electromagnetic forces.

Prior art molds for vacuum arc melting have been universally constructed of copper for a number of reasons. Rapid solidification of the molten metal in an arc furnace is considered desirable for the production of highest quality ingots. Thus, the high heat conductivity of copper has been considered most important for rapid removal of heat from and solidification of the arc melted ingot. Moreover, copper, having such a high heat conductivity, has generally been considered essential to minimize puncture of the mold, an occurrence which can have disastrous results. However, the relatively recent development of arc controls, such as those described in United States Patent No. 2,915,572, which are capable of consistently maintaining a short arc gap between the end of the electrode and the pool of molten metal, have substantially decreased the danger of mold puncture even when high currents are used.

It has been found that undesirable segregation in arc melted ingots, such as that illustrated in FIGURE 2, can be avoided by creating, electromagnetically, within the furnace, forces substantially equal in magnitude but opposed in direction to the forces created within the conventional furnace. These opposed forces are preferably created by constructing the mold of a ferromagnetic material, such as low carbon steel, which is incompletely saturated in the magnetic field created by the operative melting current within the furnace.

A force of attraction exists between a current-carrying element of the molten liquid as hereinabove described, and the magnetic material of which the molds of the invention are constructed. The nature of such attractive force may be illustrated by considering a current-carrying conductor 37 located near a plate 38 of ferromagnetic material, as illustrated in FIGURE 3, wherein the numeral 39 designates lines of magnetic flux in the field so created. These flux lines 39 enter the surface 41 of the highly permeable magnetic material at an angle nearly perpendicular to that surface. The pattern of the magnetic flux lines 39 to the left-hand side (FIG. 3) of the magnetic plate 38 is the same as that of a set of imaginary flux lines 42 created by the conductor 37, considered together with an imaginary image conductor 43 located to the right-hand side (FIG. 3) of the plate 38 (FIG. 3)

and at a distance therefrom equal to the distance between the conductor 39 and the plate 38. Consequently, the equation for the attractive force between two spaced-apart conductors carrying current in the same direction can be used to estimate the force between an element of current-carrying metal and the wall of the magnetic mold, wherein the latter is represented by the magnetic plate 38. Thus, $$f = \left[\frac{(i)}{10}\right]^2 \times \frac{l}{b} \qquad \text{(Equation 7)}$$

wherein $l$ is the length of the conductor, in centimeters, $i$ is the current, in amperes, flowing through the conductor, $b$ is the distance, in centimeters, between the conductor and the magnetic plate or mold wall, and the force $f$ is expressed in dynes.

The force $f$ is seen to be dependent upon the current density which, as aforementioned, is not uniform throughout the cross-section of the molten pool. The magnitude of the force $f$ can be compared with that of the force $F_c$ (Equation 6) resulting from the magnetic field produced by the melting current, provided that the same assumption of current density is used, i.e., 1,000 amperes per square centimeter. When this concentrated current is near the mold wall, e.g., one inch therefrom, the force $f$ exerted on one cubic centimeter of liquid carrying a current of 1,000 amperes is on the order of several grams. The direction of this force is toward the nearest portion of the mold wall. The force $f$ is, therefore, of the same order of magnitude but in an opposite direction to the force $F_c$. Furthermore, both forces are at maximum values when the concentrated arc is near the mold wall and decrease in magnitude as the arc approaches the center of the mold. These opposite forces, therefore, essentially cancel each other over the entire cross-sectional area of the mold. Consequently, movement of the liquid metal between solidifying dendrites, which liquid metal is higher in alloy and impurity content than the remaining, main pool of liquid metal, is therefore decreased and the radial segregation illustrated in FIGURE 2 thereby eliminated.

It is advantageous to have the ferromagnetic material as near the liquid metal as possible and therefore the use of a mold made of such material is preferred. However, decreased segregation will also result if a non-magnetic mold is surrounded by a magnetic material, to the extent that the latter can be spaced closely to the mold wall, for example, within about two inches therefrom. The latter alternative is not preferred, since it is also of distinct economic advantage to provide a single article serving the dual functions of both a mold for containing the metal to be melted and as a source of the electromagnetically created force $f$.

Although, for reasons for economy and ease of fabrication, plain carbon steel is preferred as a mold material, other materials may be utilized to create the electromagnetic forces required to produce the desirable results of the invention. It is required, however, that such materials, in order to perform this function to advantage be of such a nature that they are incompletely saturated at the field strength existing in the furnace and created by the operative melting current. The usability of various materials of this sort is, therefore, dependent upon the magnitude of the melting current utilized on the geometry of the furnace, specifically the diameter thereof. However, knowledge of such factors, together with readily obtainable information as to the incremental permeability of a potential mold material at a given field strength, will easily enable one skilled in the art to select a proper material which will satisfy the requirements developed by the invention for creation of the opposing electromagnetic forces which will, as aforesaid eliminate the undersirable segregation encountered in prior art processes and apparatus.

Figure 4:
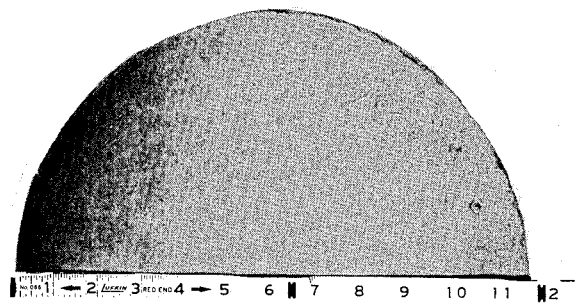
FIGURE 4 is a photographic representation of a metal ingot, vacuum arc melted in accordance with the present invention, and illustrative of the relatively segregation-free products so obtained.

FIGURE 4 is illustrative of the unexpected and advantageous results of the invention. This figure constitutes a photographic representation of one-half of a cross-section slice of an ingot of AISI 52100 steel produced in accordance with the invention and prepared in a manner identical to the sample illustrated in FIGURE 2. The ingot illustrated in FIGURE 4 was melted with the same current and under the same conditions as the segregation ingot illustrated in FIGURE 2 except that a mold constructed of carbon steel was utilized instead of the conventional copper mold. Visual comparison of FIGURES 2 and 4 readily shows the segregation-free character of the FIGURE 4 ingot.

That the drastic difference in the structures of the ingots of FIGURES 2 and 4 was not related to the differences in the heat conductivities of steel and copper (and hence to the rate of solidification of the ingot) was established by melting a 12-inch diameter ingot of the same AISI 52100 steel composition in a mold of non-magnetic stainless steel. The segregation observed in the latter ingot was as extensive or even worse than that appearing in the ingot of FIGURE 2.

At the melting currents employed for arc melting steels in conventional arc furnaces, the field strengths are generally on the order of 80 oersteds in the mold material. Consequently, for such furnaces, a mold material that is incompletely saturated, that is, a material having a relatively high incremental permeability, at the prevailing field strength is contemplated and it is not desirable to utilize a material for the mold which approaches saturation at a substantially lower field strength. Under these conditions, steel with a low alloy content and a carbon content below about 0.15% has suitable magnetic properties, i.e., it is incompletely saturated at the given field strength. Such steel also has a higher thermal conductivity than steels with a high alloy content and thus exhibits further advantages in minimizing possible arc puncture of the mold.

When the arc, i.e., the melting current, is displaced from the center of the mold, that is, toward the mold wall, the magnetic flux is increased in the adjacent portion of the mold wall. The density of the flux lines, such as lines 39, which pass through the magnetic mold wall is, of course, dependent upon the thickness of the mold wall, and the minimum value for the latter dimension is chosen of a value to avoid saturation of the ferromagnetic material in the prevailing electromagnetic field. For a plain carbon steel mold in a conventional arc melting furnace operating at a field strength of 80 oersteds, a mold wall thickness of ½ inch has been found to give a suitable value for the flux density. Mold wall thicknesses in the range of from about ½ to ¾ inch are preferred inasmuch as greater thicknesses may result in pitting of the metal by the arc.

It is to be understood that the foregoing specific embodiments and examples are merely illustrative of the principles of the invention and that various modifications and changes may be made by those skilled in the art without departing from the spirit and scope of the invention.

What is claimed is:

1. A consumable electrode electric arc furnace comprising means to support the electrode, first means surrounding a lower portion of the electrode and defining a mold cavity for reception of metal melted from the electrode by an electric current-carrying arc, second means to provide an electrode melting current-carrying arc between the electrode and metal contained within said cavity, said first means comprising an inner sleeve and an outer sleeve, said sleeves being concentrically spaced apart to define a fluid-cooling passage, said first means also comprising a ferromagnetic portion surrounding the mold cavity and positioned sufficiently close to said cavity to interact with an operative electrode-melting arc current to create an electromagnetic field within the mold cavity during melting of the electrode, and said ferromagnetic portion having a permeability such that said portion is incompletely saturated at the flux density of said electromagnetic field.

2. An apparatus in accordance with claim 1 wherein the ferromagnetic material is carbon steel.

3. A method of producing substantially segregation-free metal ingots by a consumable electrode vacuum arc melting process, comprising melting the metal electrode by an electric current-carrying arc into a mold constructed of a ferromagnetic material, solidifying the metal in the mold and limiting the arc current to a value below that productive of an electromagnetic field within the mold having a flux density sufficiently great to saturate the ferromagnetic mold.

4. A consumable electrode electric arc furnace comprising means to support the electrode, a mold surrounding a lower portion of the electrode, means to cool the mold, means to provide an electrode-melting current-carrying arc between the electrode and metal contained within the mold, and said mold comprising a ferromagnetic material which is incompletely saturated at a field strength $$H = \frac{0.2I}{R}$$

where H is the strength, in oersteds, of an electromagnetic field created by interaction of the ferromagnetic mold with an operative electrode-melting arc current, I is the arc current in amperes, and R is the mold radius in centimeters.

5. In the process of electric arc melting wherein metal is melted from a consumable electrode by an electric current-carrying arc extending between the electrode and a pool of molten metal, the improvement which comprises melting the metal in and solidifying the same within a melting and freezing zone enclosed within a ferromagnetic medium, positioning the ferromagnetic medium within the influence of the arc current so as to create an electromagnetic field in the melting and freezing zone, and limiting said field to a strength less than that required to saturate the ferromagnetic medium.

References Cited by the Examiner

UNITED STATES PATENTS

| 2,601,647 | 6/52  | Upper | 22—139 XR |
| 2,951,890 | 9/60  | Yeomans et al. | 13—34 |
| 3,067,473 | 12/62 | Hopkins | 22—57 XR |

FOREIGN PATENTS

| 170,923 | 4/52 | Austria. |
| 554,753 | 3/58 | Canada. |

MARCUS U. LYONS, *Primary Examiner.*

MICHAEL V. BRINDISI, *Examiner.*

UNITED STATES PATENT OFFICE
CERTIFICATE OF CORRECTION

Patent No. 3,213,495                          October 26, 1965

Russell C. Buehl

It is hereby certified that error appears in the above numbered patent requiring correction and that the said Letters Patent should read as corrected below.

Column 1, line 39, for "inclusion" read -- inclusions --; column 4, line 42, for "alloys" read -- lowers --; line 46, for "and decreasing" read -- with decreasing --; column 5, lines 14 and 15, for that portion of Equation 4 reading $$\frac{\pi r_2}{\pi R_2} \quad \text{read} \quad \frac{\pi r^2}{\pi R^2}$$

column 7, line 54, for "for economy" read -- of economy --; line 64, for "on" read -- and --; column 8, line 3, for "cross-section" read -- cross-sectional --; line 36, for "advantages" read -- advantage --.

Signed and sealed this 29th day of November 1966.

(SEAL)
Attest:

ERNEST W. SWIDER                        EDWARD J. BRENNER
Attesting Officer                   Commissioner of Patents